Figure 7:
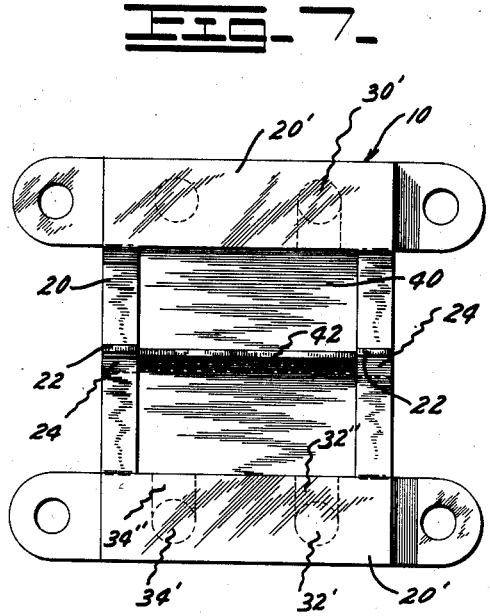

Dec. 9, 1958  T. E. UPHAM  2,863,676
MULTIPLE BREAKAWAY SLIDE SEAL COUPLING
Filed March 5, 1956  3 Sheets-Sheet 1
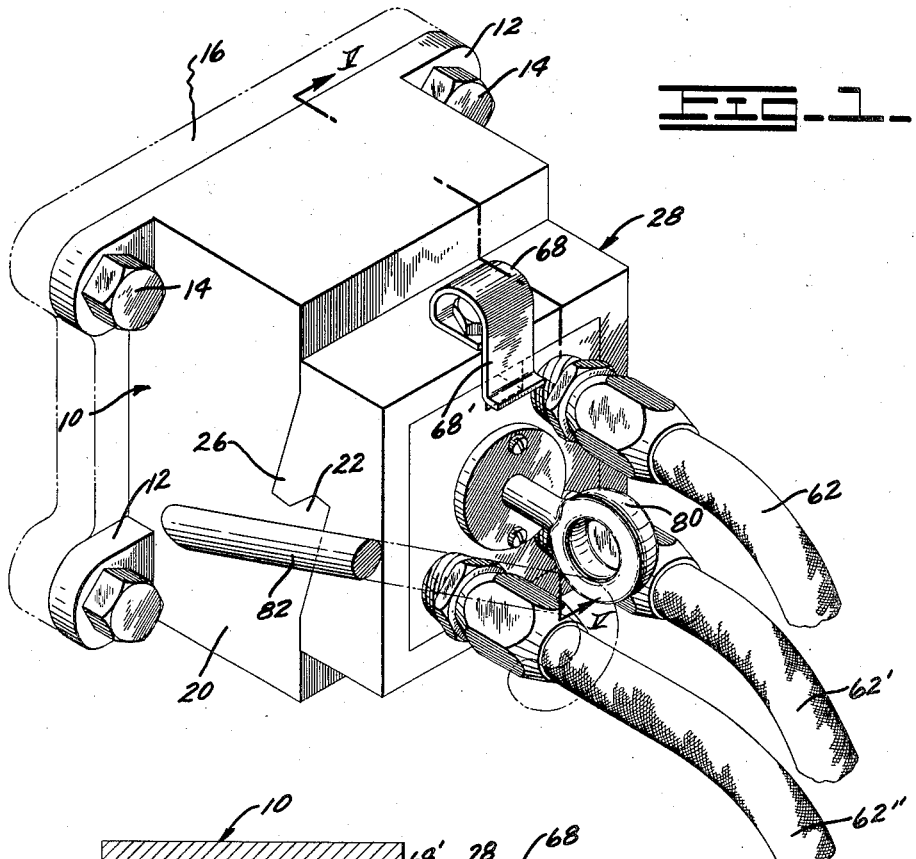
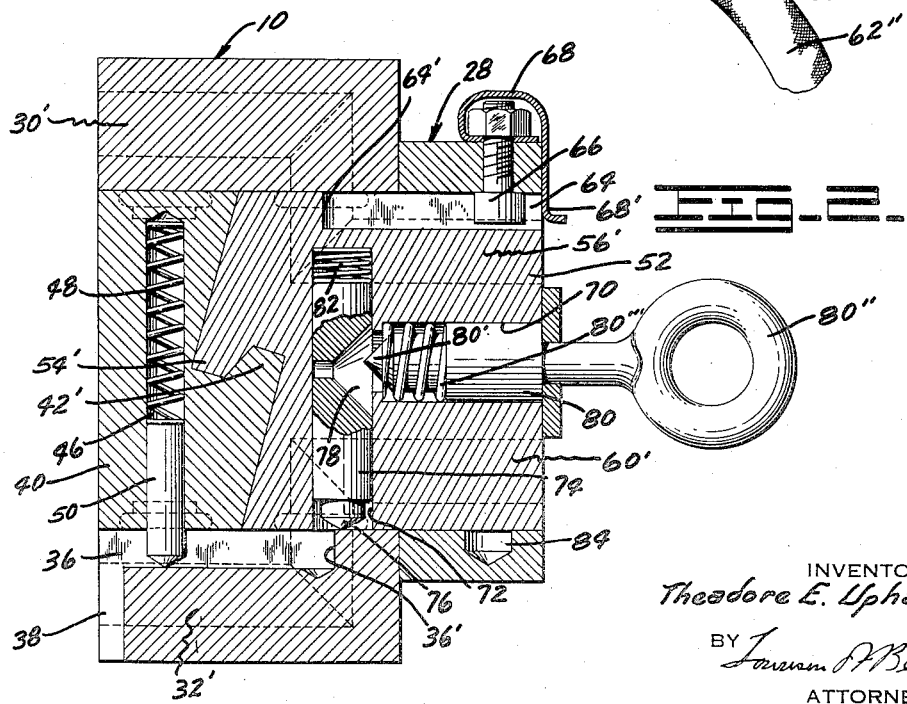
INVENTOR
Theodore E. Upham
BY
ATTORNEY

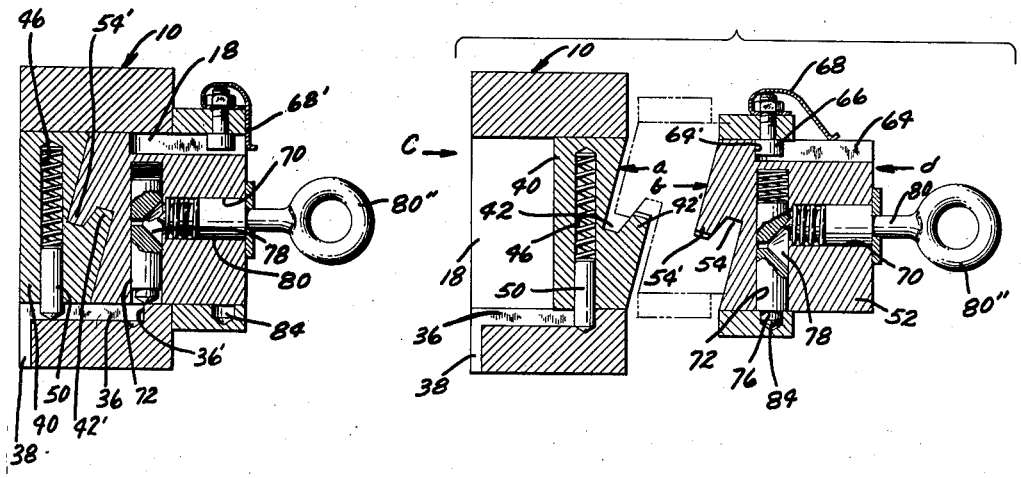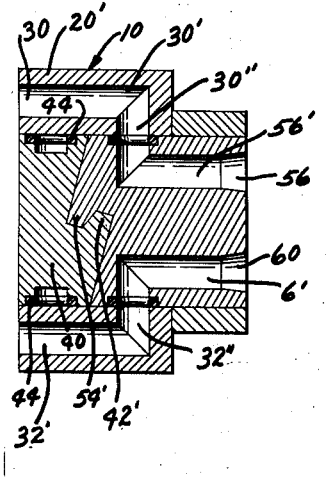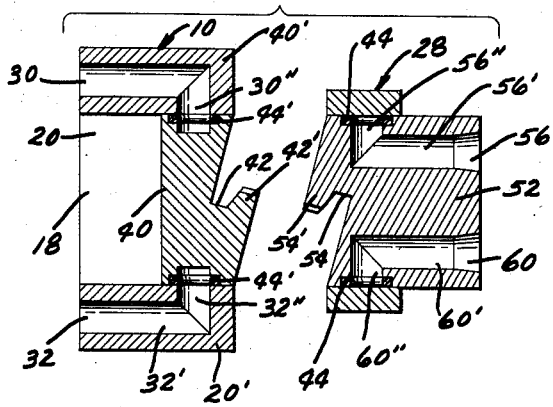

Dec. 9, 1958  T. E. UPHAM  2,863,676
MULTIPLE BREAKAWAY SLIDE SEAL COUPLING
Filed March 5, 1956  3 Sheets-Sheet 3

INVENTOR
Theodore E. Upham
BY
ATTORNEY

United States Patent Office 2,863,676
Patented Dec. 9, 1958

2,863,676

MULTIPLE BREAKAWAY SLIDE SEAL COUPLING

Theadore E. Upham, Jackson, Mich., assignor to Aeroquip Corporation, Jackson, Mich., a corporation of Michigan Application March 5, 1956, Serial No. 569,520

4 Claims. (Cl. 284—2)

This invention relates to couplings for connecting hose or pipe lines for the conduction of fluids and in particular to couplings which possess the ability for automatic disconnection to take place upon the occurrence of a pre-determined pull exerted upon the connected hose or pipe lines. Such couplings have become known in the art as "automatic breakaway couplings."

A prior art breakaway coupling provided for the connection of a pair of fluid conductors in the form of flexible hose lines coupled to opposite sides of relatively movable parts of the coupling, two flexible hose lines on one side of the coupling being connected, for example, to a tractor, and a companion pair of flexible hose lines on the opposite side of the coupling being connected, for example, to a trailer, or to a farm implement. Such coupling construction necessitated that lengths of flexible hose should extend from the tractor, or the like, with the consequential probability of the coupling itself dragging along the ground and becoming clogged with dirt.

It is an object of the present invention to provide a breakaway coupling which can be mounted directly and rigidly upon a tractor, or the like, and which can be made to provide for the connection of a greater number of fluid conductor lines than is possible with the prior art couplings.

Another object of the invention is to provide a coupling which is of rigid and robust construction.

These and further objects and advantages of the invention, residing in the construction, combination and arrangement of parts will appear clear from consideration of the following description with reference to the accompanying drawings, and from the appended claims.

Figure 8:
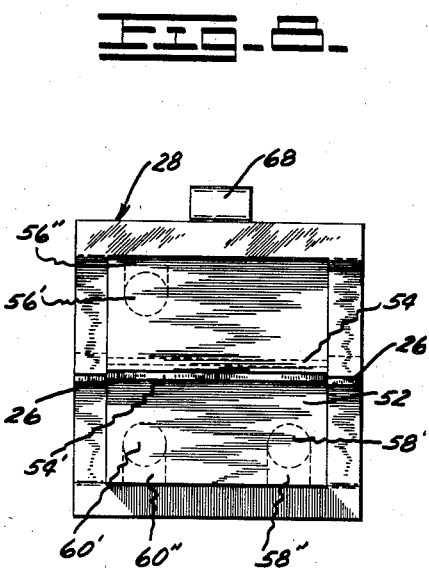
Figure 9:
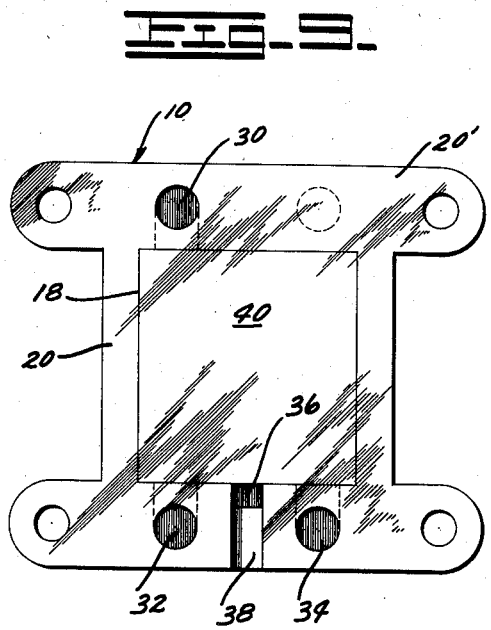
Figure 10:
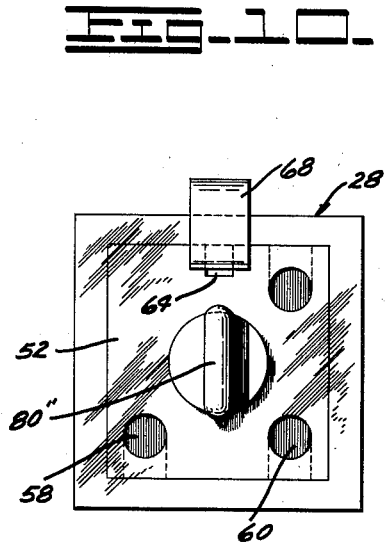

In the drawings,

Fig. 1 is a perspective view of a breakaway coupling according to the invention, Fig. 2 is a longitudinal section through the center of Fig. 1, Fig. 3 is a similar view to Fig. 2, but on a reduced scale, and confined to the showing of the locking mechanism, Fig. 4 is a view of the coupling seen in Fig. 3 but with the coupling halves disconnected, Fig. 5 is a similar view to Fig. 3 but with the section taken in a plane through the fluid conductor parts in the coupling and corresponding to the section line V—V indicated in Fig. 1, Fig. 6 is a view of the coupling as seen in Fig. 5 but showing the coupling halves disconnected, Fig. 7 is an end view looking in the direction of arrow *a* in Fig. 4, Fig. 8 is an end view looking in the direction of arrow *b* in Fig. 4, Fig. 9 is an end view looking in the direction of arrow *c* in Fig. 4, and Fig. 10 is an end view looking in the direction of arrow *d* in Fig. 4.

In the drawings, 10 indicates a rectangular external body part having at one end corner lugs 12 for receiving bolts 14 for securing the body part upon a fixed structure 16, which structure may be part of a tractor and is connectable, for instance, with the manifold of a hydraulic pump (not shown). The body part is formed with an interior rectangular chamber 18 open at opposite ends and closed at its sides by the side walls 20. The side walls 20 along one edge thereof are formed with teeth 22 defining grooves 24 (Fig. 7) in which hook portions 26 on a further body part 28 engage in the connected condition of the coupling body parts 10 and 28.

The body part 10 has a series of ports, indicated at 30, 32 and 34 in Figs. 5, 6 and 9, of which ports 30 and 32 communicate, via conduits 30', 32' with ports 30" and 32", respectively, open to the inner surfaces of the top and bottom walls 20', as seen in the drawings. Port 34 communicates with a conduit 34' (Fig. 7) with a port 34" which opens to the inner surface of the bottom casing wall 20'. Body part 10 also has a longitudinal groove 36 on the inner surface of its bottom wall, as seen in Figs. 2, 3 and 9, this groove being closed at one end 36 and being open at its opposite end, where groove 36 communicates with a vertical groove 38 open to the atmosphere.

Mounted for rectilinear sliding motion within the chamber 18 of body part 10 there is a valve block 40 formed on one surface facing the teeth 22, with an elongated groove 42 of a shape corresponding to the grooves 24 this groove defining an elongated tooth 42' at the corresponding surface of block 40. The top and bottom surfaces of this valve block carry sealing rings 44 for maintaining a fluid seal with respect to the inside surfaces of the top and bottom walls of the body part 10. Valve block 40 also has a vertical bore 46 containing a spring 48 and a plug 50. Spring 48 constantly urges the plug 50 outwards so that the plug is constrained to travel along the groove 36.

The body part 28 is of hollow rectangular shape and carries an interior rectilinearly slidable block 52 one end face of which, as seen in Figs. 8 and 10, is formed with a longitudinal groove 54 corresponding in shape and location to the groove 42, said groove defining an elongated tooth 54' at the corresponding surface of block 52. The body part 28 itself has its side walls formed with teeth 26, these teeth corresponding to the teeth 22 on the body part 10. The block 52 is formed with ports 56, 58, 60 and conduits 56', 58', 60' corresponding with the previously described ports and conduits, said conduits 56', 58', 60' opening to further ports 56", 58", 60" in the top and bottom surfaces of the blocks 52, as seen in the drawings. The ports 56, 58, 60 are formed for the connection of the flexible hose lines 62, 62', 62" seen in Fig. 1.

The block 52 is also formed with a longitudinal groove 64 (Figs. 2, 4 and 10) closed at one end 64' and accommodating the head 66 of a bolt secured in the body part 28, said bolt serving also to secure a leaf spring 68 in position, where a projection 68' of the spring lies opposite the otherwise open end of the groove 64.

Block 52 is also formed with a longitudinal bore 70 opening at one end to a vertical bore 72. Mounted in bore 72 there is a plunger 74 having a tapered nose end 76 and a conical recess 78 intermediate its ends, said recess lying opposite a plunger 80 mounted within the longitudinal bore 70. Plunger 74 is urged to an outwardly projected position by a spring 82, and plunger 80 (which has a tapered nose end 80' and an outer end ring 80") is also urged outwardly by spring 80'". 84 indicates a recess in body part 28 in which the nose end 76 of plunger 74 engages in the disconnected condition of the coupling as seen in Fig. 4.

In operation, with the coupling parts 10, 28 in the fully connected condition as illustrated in Figs. 1, 2, 3 and 5 the teeth 22 and 26 are held interlocked, as also are the teeth 42' and 54', and the thus interlocked blocks 40 and 52 have been pushed into the position in which ports and conduits 30, 30', 30", and 32, 32', 32" and 34, 34', 34", in the body part 10 and the ports and conduits 56, 56', 56" and 60, 60', 60" and 58, 58', 58", respectively, in the block 52 are in open communication for the flow of fluid through the coupling, as seen clearly in Fig. 5. In this condition of the parts the extension 68' of leaf spring 68 is engaged against the block 52, as seen in Figs. 2 and 3, and exerts pressure against this block to hold the interlocked blocks in the position in which said ports and conduits are in open fluid flow relation. Considering the ports in the condition as thus described a predetermined pull exerted on the hose lines 62, 62', 62" toward the right as viewed in Fig. 1 (it being assumed that part 16, and hence coupling part 10, is fixed) will constrain the interlocked blocks 40 and 52 to be slid to the right relatively to the still interlocked body parts with attendant lifting of the spring projection 68' and positioning of bolt head 66 to the end 64' of groove 64. At the time when the bolt head 66 occupies the end of said groove the still interlocked blocks will have reached the position in which the tapered end 76 of plunger 74 will have been brought opposite the recess 84 in body part 28, whereupon the spring 82 functions immediately to project said plunger end 76 into said recess 84 to thus lock the block 52 with its body part 28. Consequently, continued pulling on the hose lines will cause the teeth 26 on body part 28 and the teeth 54' on the block to cam with respect to their corresponding teeth in the body part 10 and block 40 (the inclination of the inter-engaged teeth surfaces being chosen so that such camming action is possible) and thereby cause the interlocked block 52 and its body part 28 to move upwardly (as seen in Fig. 4) to the release position, as seen in dotted lines in Fig. 4. From this position the interconnected block 52 and body part are free to move apart from the coupling part 10. When plunger end 76 enters the recess 84 the block 52 will have become so positioned with respect to its body part 28 that the ports 56", 58", 60" in said block will be closed with respect to said body part and sealed thereagainst by the sealing rings 44. Further, at the time when this happens, the end of the plunger 50 which engages in groove 36 of body part 10 will have reached the closed end 36' of said groove, in which position the ports 30", 32" and 34" will be closed with respect to the body part 10 and be sealed thereagainst by the sealing rings 44'.

During disconnection of the coupling parts 10, 28 any tendency for a vacuum to occur in chamber 18 is circumvented by exhaust to atmosphere through groove 38.

It is to be noted that projection of plunger 74 to engage its end 76 in recess 84 brings the surface of conical recess 78 against the tapered end 80' of plunger 80, as seen in Fig. 4.

To connect the coupling parts, with the same as seen in Fig. 4, the teeth 22, 26 and 42', 54' are re-engaged. At this point it is to be noted from consideration of Figs. 7 and 8 that the upper surfaces of the teeth 22 extend slightly above the upper surface of groove 42, as also do the upper surfaces of teeth 26 extend slightly above the upper surface of groove 54. Also, the bottom surfaces of grooves 42 and 54 extend slightly above the bottom surfaces of the grooves defined behind the teeth 22 and 26. This prevents misalignment of the body parts by it being necessary to properly position them laterally for connection. With the coupling teeth re-engaged and with the plunger end 80' positioned as seen in Fig. 4, plunger 80 is pushed-in, which can be effected by engaging a bar (not shown) in ring 80" and using a hooked rod 82 as a fulcrum. Pushing in the plunger 80 will cause the end 80' to engage the conical surface of the recess 78 to cam the plunger 74 upwardly and the end 76 of plunger 74 to be lifted out of the recess 84 against the action of spring 82. Block 52, therefore, is now freed to move relatively to its body part 28 so that inward pressure exerted upon the connected blocks 52 and 40 will cause these to move relatively to the connected body parts (these being connected by engagement of the teeth 22, 26) to reposition the blocks with the aforesaid ports and conduits in open position as seen in Figs. 2, 3 and 5.

To disconnect the coupling parts manually it is necessary, with the parts pulled manually to the position seen in Fig. 4, to pull on ring 80" to free the block 52 to move relatively to its body part 28.

I claim:

1. A coupling comprising in combination, a pair of opposed body parts, each having an interior chamber, one said body part having means for rigidly mounting this body part upon a relatively fixed structure, said rigidly mountable body part having at least one fluid conduit therethrough, one end of said fluid conduit comprising a port opening into said chamber, a valve block slidably mounted in said chamber for movement from one position opposite said port and another position clear of said port, said other body part having a valve block slidable in the chamber thereof, said valve block having at least one fluid conduit therethrough, said conduit terminating in a port closed by said body part in one position of said valve, the other end of said conduit having means for connection to a hose, portions on the opposed body parts for holding them in interlocked relation, portions on said valve block for holding them in interlocked relation whereby they are slidable together relative to said body parts, means on said other body part engageable with the valve block therein for holding the interlocked valve blocks in an extreme position in which the port in the valve block of the other body part is in register with the port in said rigidly mountable body part and means on said portions for releasing said body parts and their valve blocks after movement of said valve blocks to their other extreme position.

2. A coupling as claimed in claim 1 wherein said last means are in the form of teeth having inclined surfaces forming cams by which said interlocked portions are released with cam action upon said body parts being moved to said opposite extreme position.

3. A coupling as claimed in claim 1 said rigidly mountable body part having a groove and its corresponding valve block carrying a spring biased plug urged into engagement with said groove, said groove being open to atmsphere at one end to prevent the formation of a vacuum upon connection of the coupling parts.

4. A coupling as claimed in claim 1, the valve block of said other body part carrying a plunger and said other body part having a recess for receiving said plunger upon movement of its corresponding valve block to one extreme position corresponding to the disconnected condition of the coupling parts, spring means constantly urging said plunger for engagement with said recess, an actuator on said other body part and accessible thereon for actuation to engage said plunger in said valve block to lift said plunger from said recess, said actuator and plunger having engaging cam and follower portions to lift said plunger upon relative movement between said actuator and said plunger.

References Cited in the file of this patent

UNITED STATES PATENTS

| | | |
|---|---|---|
| 1,215,481 | Cantin | Feb. 13, 1917 |
| 1,973,610 | Connors | Sept. 11, 1934 |